United States Patent
Medina, III et al.

(10) Patent No.: US 8,458,016 B1
(45) Date of Patent: Jun. 4, 2013

(54) SYSTEMS AND METHODS FOR ASSOCIATING CREDIT CARDS AND POOLING REWARD POINTS

(75) Inventors: Reynaldo Medina, III, San Antonio, TX (US); John James Sundberg, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 854 days.

(21) Appl. No.: 12/209,668

(22) Filed: Sep. 12, 2008

(51) Int. Cl.
*G06Q 30/00* (2006.01)

(52) U.S. Cl.
USPC ............ 705/14; 705/14.31; 705/14.32

(58) Field of Classification Search
USPC .............. 705/14.25, 14.31, 14.32, 14.36
See application file for complete search history.

(56) References Cited

U.S. PATENT DOCUMENTS

| | | | |
|---|---|---|---|
| 2002/0155885 A1 | 10/2002 | Shvili | |
| 2004/0138900 A1* | 7/2004 | Read | 705/1 |
| 2004/0181453 A1* | 9/2004 | Ray et al. | 705/16 |
| 2004/0205065 A1* | 10/2004 | Petras et al. | 707/5 |
| 2005/0240438 A1 | 10/2005 | Day | |
| 2005/0283435 A1 | 12/2005 | Mobed et al. | |
| 2007/0038515 A1 | 2/2007 | Postrel | |
| 2007/0106556 A1* | 5/2007 | Edwards et al. | 705/14 |
| 2007/0179840 A1 | 8/2007 | Kroner et al. | |
| 2008/0015935 A1 | 1/2008 | Ford | |
| 2008/0033857 A1 | 2/2008 | Moses | |
| 2008/0201224 A1 | 8/2008 | Owens et al. | |

OTHER PUBLICATIONS

Levey, Richard H.: "U.S. Bank Launches Invitation-Only Credit Card Loyalty Program", www.directmag.com, Apr. 12, 2004, 2 pgs.

* cited by examiner

*Primary Examiner* — Lindsay M. Maguire
(74) *Attorney, Agent, or Firm* — Brooks, Cameron & Huebsch, PLLC

(57) ABSTRACT

Disparate account holders may form a group or buying club within which points or rewards for credit or debit card use are allocated into a pool for the account holders. At the end of a billing cycle, transaction totals may be weighted based on the type or number of items purchased by members of the group to making point or reward allocations into the pool. Account holders may be added to the group by invitation as members of a group operate to solicit friends having similar interests and character to join the group. Merchants may market products to like-minded account holders in the group through one or a few members in a manner consistent with social networks or viral marketing approaches.

21 Claims, 5 Drawing Sheets

SYSTEMS AND METHODS FOR ASSOCIATING CREDIT CARDS AND POOLING REWARD POINTS

CROSS REFERENCES

The subject matter described in this application is related to subject matter disclosed in the following commonly assigned applications: U.S. patent application Ser. No. 12/209,654, filed Sep. 12, 2008; U.S. patent application Ser. No. 12/209,693, filed Sep. 12, 2008; U.S. patent application Ser. No. 12/209,712, filed Sep. 12, 2008; and U.S. patent application Ser. No. 12/209,726, filed Sep. 12, 2008, each entitled "Systems and Methods for Associating Credit Cards and Pooling Reward Points."

BACKGROUND

Many credit card issuers offer reward programs to provide an incentive for account holders to use a credit/debit card associated with the rewards program. Individuals often carry different cards to participate in a variety of different rewards programs. A typical program awards points based on the amount and/or type of purchases made using the card. Depending on the purchase, an individual may select the appropriate card with the greatest reward opportunity associated with that particular purchase.

In addition to carrying multiple cards as an individual, individuals can share ownership of credit card accounts with other members of their family or by operation of a contractual or other relationship (e.g., an employer-employee relationship). For example, a husband and wife, a parent and child, employees, etc. may share cards. Thus, if the accounts are shared among individuals, as noted above, the reward points may accrue on a shared basis. However, if the accounts are held individually, then the reward points accrue to the individual account holders as card issuers do not provide a mechanism by which unrelated individuals may share rewards points or jointly participate in a rewards program.

SUMMARY

Disparate account holders may form a group or buying club within which points or rewards for credit or debit card use are allocated into a pool for the account holders. At the end of a billing cycle, transaction totals may be weighted based on the type or number of items purchased by members of the group to make point or reward allocations into the pool. Account holders may be added to the group by invitation as members of a group operate to solicit friends though social networking that have similar interests and character to join the group. Merchants may market products to like-minded account holders in the group through one or a few members in a manner consistent with social networks or viral marketing approaches.

The foregoing is a summary and thus contains, by necessity, simplifications, generalizations, and omissions of detail. Those skilled in the art will appreciate that the summary is illustrative only and is not intended to be in any way limiting.

BRIEF DESCRIPTION OF THE DRAWINGS

The foregoing summary, as well as the following detailed description of preferred embodiments, is better understood when read in conjunction with the appended drawings. For the purposes of illustration, there are shown in the drawings exemplary embodiments; however, the present disclosure is not limited to the specific methods and instrumentalities disclosed. In the drawings.

DETAILED DESCRIPTION

Disclosed herein are implementations for linking disparate rewards program accounts into a group or buying club so that the group may earn rewards at the group level while independent processing of the individual accounts may be performed for account activity and payment responsibility. The accounts in a group may span multiple rewards programs and may include multiple individual accounts. A typical group may include an initiating account (or primary owner of the group) and one or more invited accounts (secondary or dependent accounts). The initiating account may also be a primary contact for the group.

Figure 1:
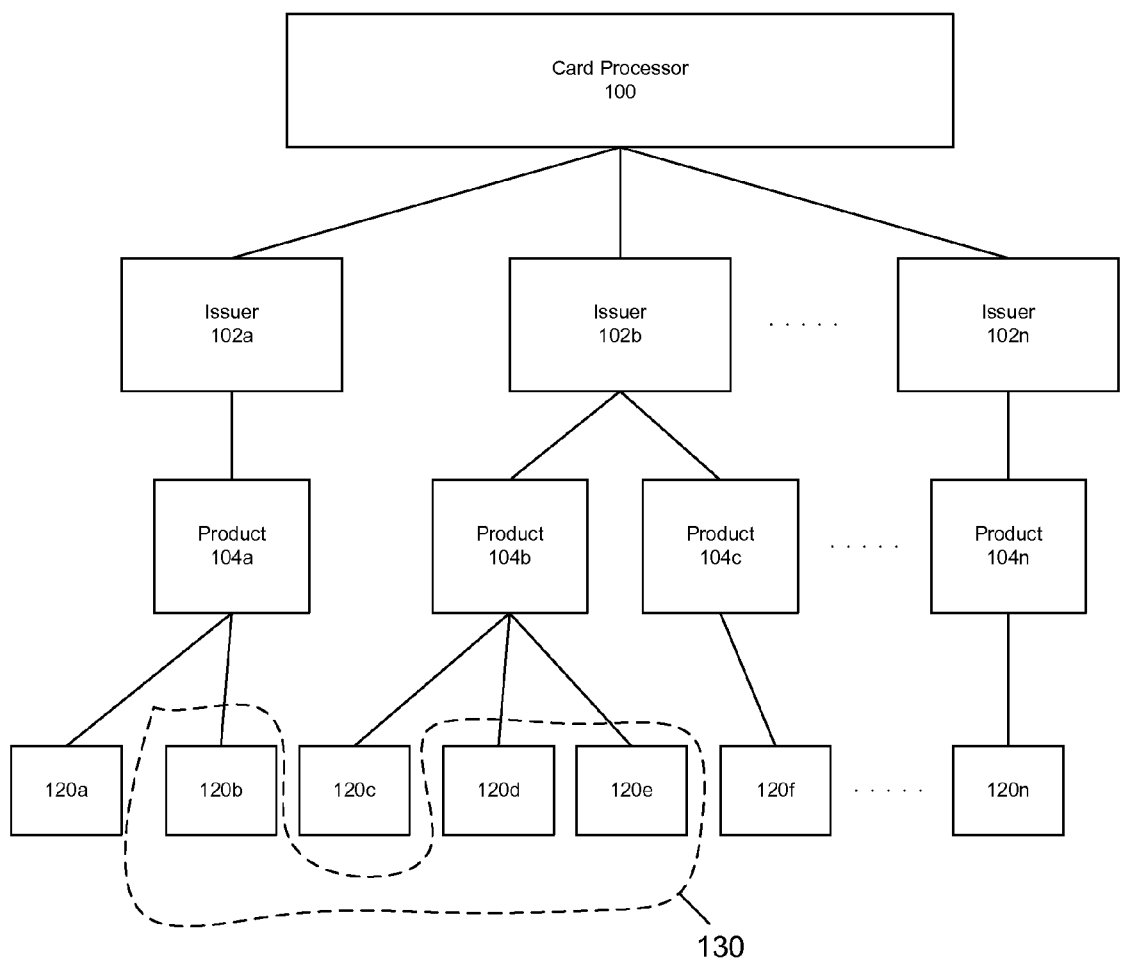
FIG. 1 illustrates an exemplary relationship between a card processor, a number of issuers, and a number of cardholder accounts.

FIG. 1 illustrates an exemplary relationship between a card processor 100, a number of issuers 102a, 102b . . . 102n, and a number of cardholder accounts 120a, 120b, 120c, 120d, 120e, 120f . . . 120n. The card processor 100 supports the issuers by authorizing and processing monetary transactions as well as providing support for creating new accounts, modifying accounts, generating cardholder statements, applying payments to accounts, controlling communications to cardholders, and building reward programs. An issuer, such as issuer 102b, is typically a bank or other financial institution that issues one or more credit card products 104a, 104b, 104c . . . 104n, such as a VISA, MASTERCARD, or a private label card.

The cardholder accounts 120a, 120b, 120c, 120d, 120e, 120f . . . 120n are typically associated with individuals holding a credit card or charge card. In addition to the elements shown in FIG. 1, additional elements (not shown) may also be included. An issuer may issue different types and versions of credit card products. For example, issuer 102b could offer a VISA product and a MASTERCARD product. Each product could be offered in rewards, standard, gold, and platinum versions.

An individual may hold a number of different cards corresponding to a number of different accounts. Although the same cardholder is associated with each of the accounts, each account may be processed independently by the issuer. If several cardholders are in the same family, then each cardholder may hold several cards. In the case of a family, the cardholders may be related and the payments may be made from family funds, but each account is still processed independently.

In some implementations, the cardholder accounts 120a, 120b, 120c, 120d, 120e, 120f . . . 120n may be linked together to create a group 130 or buying club. The group 130 may include a number of accounts that correspond to a single issuer, multiple issuers, and/or one or more products. By linking accounts into the group 130, group processing, as described below, may be performed on the accounts that are members of the group while independent processing of each of the account transactions and payments may be maintained. Alternatively or additionally, the group 130 may be able to view purchases for each cardholder accounts 120a, 120b, 120c, 120d, 120e, 120f . . . 120n on an opt-in basis.

Each group may have an initiating or primary account that may correspond to, e.g., cardholder account 120d. The remaining accounts in the group 130 (120b and 120e) may be referred to as invited, dependent or secondary accounts. The relationship between an invited account holder and the initiating account holder is one where the invited account holder is known to the initiating account holder. Thus, the invited account holder is likely a person who has similar characteristics, likes/dislikes, etc. as initiating account holder. This also makes for an inexpensive marketing mechanism for the card issuer.

FIG. 1 also shows an exemplary organization for the group 130, wherein the accounts in the group 130 may be associated with the same or different products and/or the same or different issuers. Other organizations for the group 130 are also possible. Thus, there are no restrictions on the placement of the accounts in a group, and the accounts in a group can be split between different products or the same products.

Figure 2:
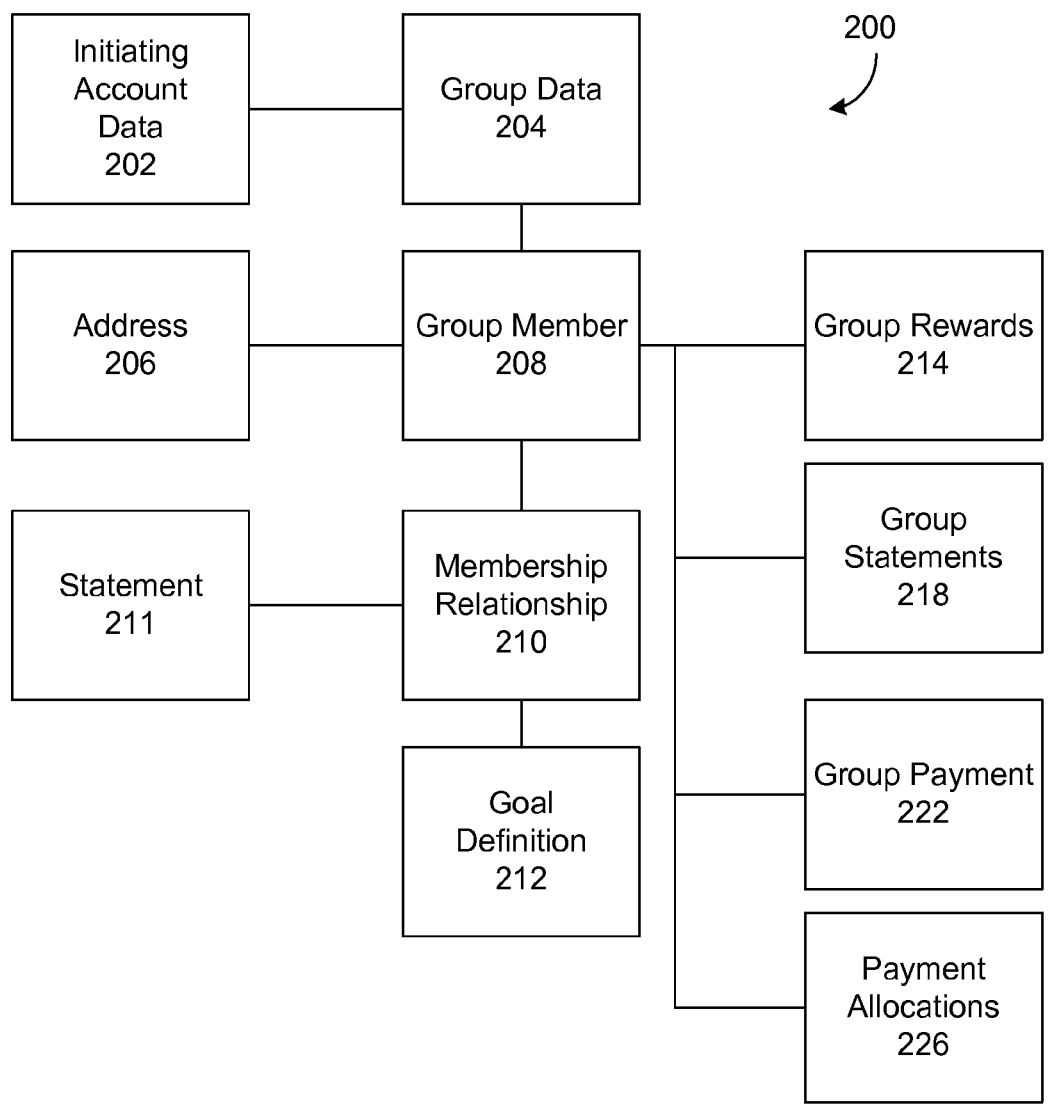
FIG. 2 illustrates the linking of the accounts into a group.

Linking the accounts into a group is accomplished by linking a financial record that corresponds to each account to a group master data record for the group. FIG. 2 illustrates the linking of the accounts into the group 130. The group master data record 200 may include information about the group 130, including group control settings, group aggregate data, and a group identifier. An initiating account data record 202 corresponds to the initiating account (e.g., 120b) that may be designated the primary owner. A group data file 204 may include information about the group, such as a group identifier, a group cycle code, a group credit line, group available credit, and a group collector code. The group identifier identifies the group.

The initiating account data record 202 may include information about the primary owner of the group. The primary owner is the individual that creates the group 130, and under some circumstances, may be liable for the group 130. If more than one individual is liable for the group, then those individuals are jointly liable for the group and information about the individuals in stored in the initiating account data record 202. For example, a primary owner and a dependent cardholder could be jointly liable for the group.

Alternatively or additionally, the primary owner may further ensure personal responsibility by having all participants in the group 103 execute an agreement that each takes full responsibility for his/her purchases. An agreement may be in place where if a predetermined number of participants decide they no longer desire to be part of the group 130, then the group 130 will dissolve and each existing cardholder account 120a, 120b, 120c, 120d, 120e, 120f . . . 120n will revert to a separate account. In some implementations, the primary owner may initiate the breakup of the group 130 at any point in time. Further, at any dissolution, the cardholder accounts 120a, 120b, 120c, 120d, 120e, 120f . . . 120n which are now all separate may elect to form another group 130 if they so choose.

The group member file 208 may include a record for each account that is a member of the group (e.g., 120b, 120d and 120e). Each record may include an account number, an indication as to whether the account is an initiating account or an invited account, and group membership information. In some implementations, a record is maintained for an account in the group member file 208 even if the account is removed from the group.

An address file 206 may include a record for each account that is or was a member of the group. Each record may include the mailing address of the cardholder associated with the account.

A member relationship file 210 may include a record for each account that is or was a member of the group. A member relationship record contains information about the goal associated with an account. If the goal associated with the account has changed, then the member relationship record contains information about the previous strategy or strategies as well as the current strategy. The member relationship record also contains information about the effective dates of each strategy.

A goal definition file 212 may include a record for each of the defined goals. The goal definition record may include the parameters and the parameter values that define the group goals. Many goals may be defined, such as a number of purchases, an amount of purchases, types of purchases (e.g., food, fuel, groceries), purchases of specific products (e.g., GM vehicles) during a billing cycle or other period. The goals may specify the relationship between an invited account and the initiating account, as well as group processing options for the group 130. The group processing options provide flexibility in the relationships between the accounts and the group. The goals may include parameters that define how transactions are authorized for the accounts, as well as whether payment for the account is due from the initiating account or from the invited account cardholder. The goals may specify options for payment application, statement generation, cardholder communications, and reward pooling.

A member statement file 211 may include records for each account that is or was a member of the group. Each record may include a number of fields that store statement data (monetary information) for the associated account. In addition, each record may include a flag that indicates whether the associated account cycles with the group (i.e. has the same cycle code as the group) or cycles independently. The information stored in the member statement file 211 is used to generate the group statement, dependent cardholder statement, and/or a courtesy statement.

A group statement file 218 may include records that contain group monetary and group non-monetary information. The group monetary information may include the group balances, as well as the group credit line and group available credit for a particular statement. The group non-monetary information may include the group payment due date. Typically, the group payment due date is the earliest due date of all the accounts of the group that are paid by the primary owner. The information stored in the group statement file 218 is used to generate the group statement.

The information in the member statement file 211 and the group statement file 218 is used to determine the initial break up of a group payment. The information is also used to support the on-line display of statement information to an operator.

The group rewards file 214 may include a record for each of the reward programs for the group. Each record may include information about the reward program, such as a reward program identifier and the amount of group points accumulated in that reward program.

The group payment file 222 may include a record for each group payment received. Each record may include the amount of the group payment and the date the group payment was received. A payment allocations file 226 may include a record for each group payment received. Each record indicates how the group payment was allocated among the accounts in the group. If a group payment is reversed, then the reversal is made by referencing the payment allocation file 226 to determine how the payment was originally allocated.

Figure 3:
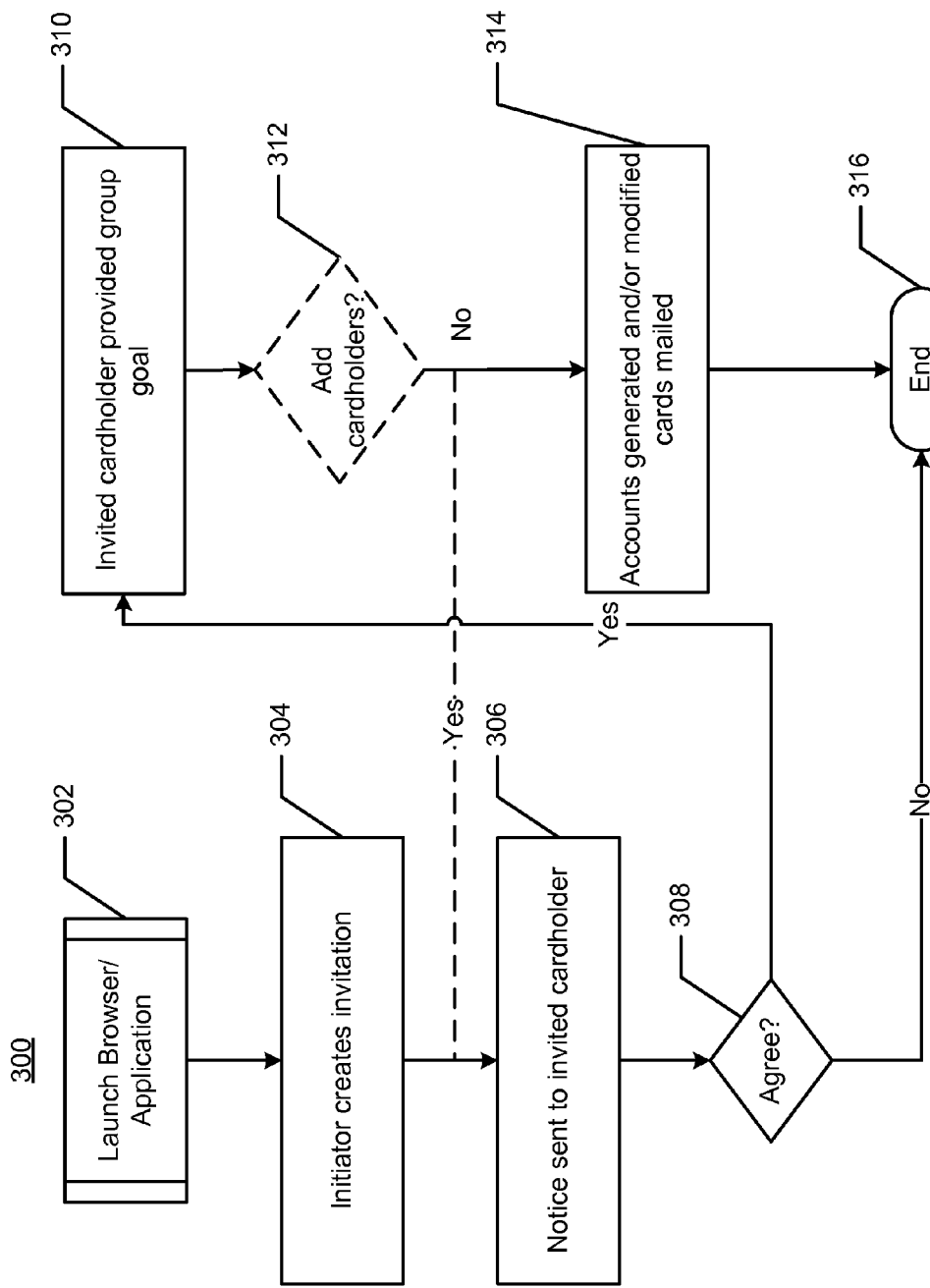
FIG. 3 is an exemplary operational flow for creating the group.

FIG. 3 is an exemplary operational flow 300 for creating the group 130. At 302, an initiator of the group 130 begins the process by launching a browser or application to create the group. The initiator may access a website provided by the card processor 100, or one or more of the issuers 102a, 102b . . . 102n. At 304, the initiator creates an invitation and a notice is sent to the invited cardholder at 306. The invitation may be sent to one of the cardholders (e.g., 120d or 120e) or in some implementations to a non-cardholder. The non-cardholder may be invited to complete an application for a product 104a, 104b, 104c . . . 104n to become a cardholder of one of the issuers.

If at 308 the cardholder accepts and agrees to the invitation terms and condition (or non-cardholder completes an application), then at 310, the invited cardholder is provided the group goal. The group goal may be set by the issuer, a merchant, or the group. The group goal may be modified over time. If at 308, the cardholder does not accept and agree, then the process flow ends at 316.

In some implementations, the accepting invited cardholder may be provided an option to add other cardholders at 312. This may provide a "viral" or social networking marketing mechanism to adding members to the group 130 as each invited cardholder may invite other cardholders, who in turn may add other cardholders up to a predetermined group limit. In addition, this may serve as an inexpensive mechanism to add cardholder account to a specific issuer. If the invited cardholder invites another cardholder (or non-cardholder as noted above), then the process flow returns to 306. Otherwise, the process flow continues at 314, where accounts are generated for cardholders in the group and/or new cards may be created for the cardholders. The process then ends at 316.

In some implementations, the process 300 may include business rules to specify the valid relationships between the accounts in the group. The business rules may define the types of accounts that can be linked together in a group. The business rules may be promulgated by the card issuer 102a, 102b, 102c . . . 102n. The business rules may be checked whenever group relationships are affected. For example, the business rules may be checked when a group is created or an account is added to or removed from a group. Example business rules may be: (1) a group must have one and only one initiating account owner; (2) a group must have a goal; (3) accounts in the group have the same billing cycle and statement date; (4) all accounts in the group must have the same issuer number; (4) accounts in the group cannot have a commercial card relationship; (5) an account cannot have a status of bankrupt, closed, or charged-off without affecting the dependent accounts, etc.

In some implementations, the business rules that specify the relationships between the accounts in the group may provide for lowering the interest rate to the cardholders in the group to a lowest rated of an individual cardholder in the group. This enables a cardholder to "sponsor" other cardholders in the group and to convey additional benefits to an invited cardholder.

Figure 4:
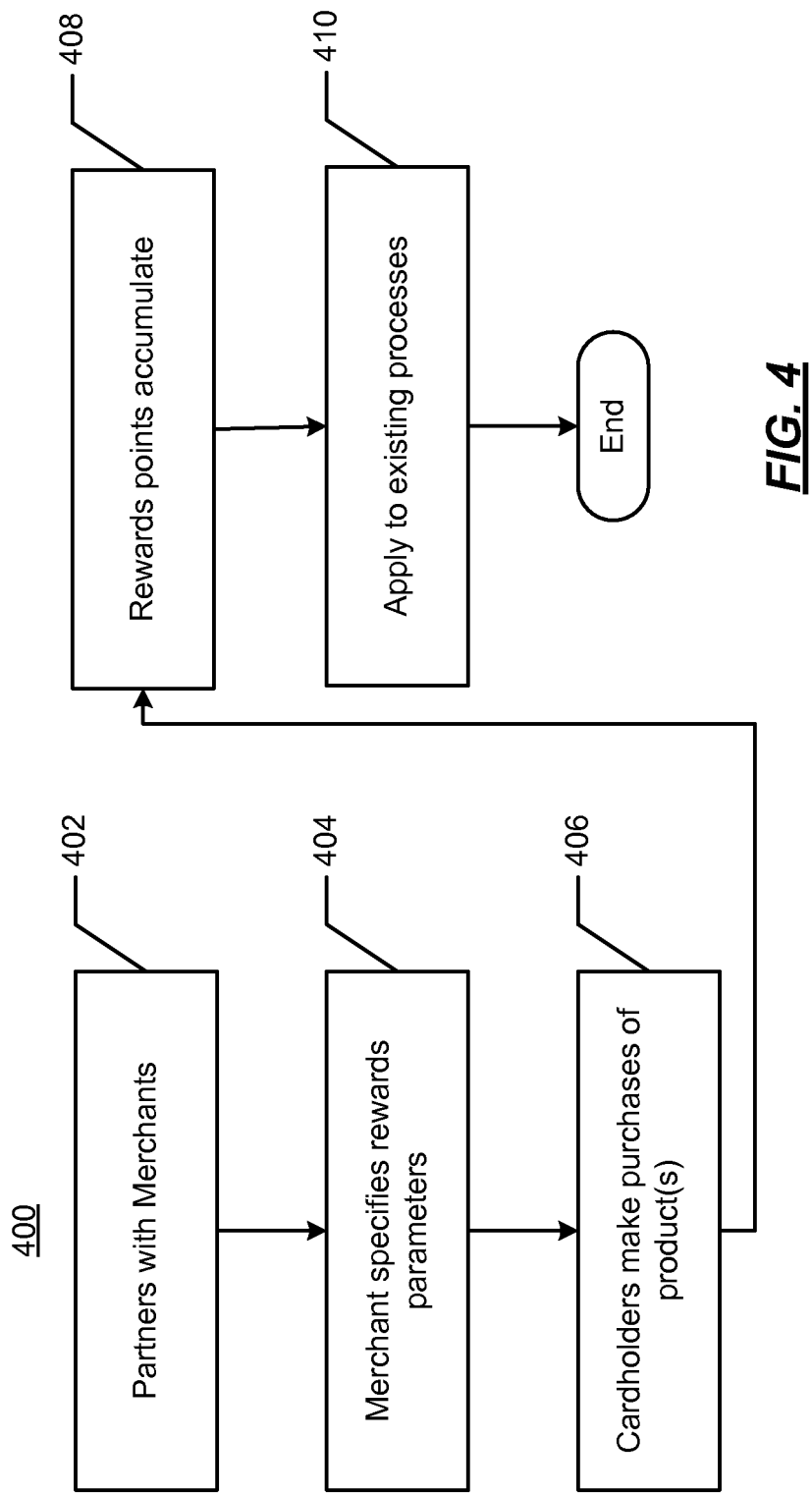
FIG. 4 illustrates an exemplary operational flow whereby a card issuer partners with a merchant to provide rewards to group members.

FIG. 4 illustrates an exemplary operational flow 400 whereby a card issuer partners with a merchant to provide rewards to group members. Partnering with a merchant may drive traffic to that particular merchant. At 402, a card issuer selects a partner with which to partner. For example, the issuer may desire to partner with General Motors. At 404, the merchant may specify the rewards parameters. For example, General Motors may wish to encourage purchases of parts and services by rewarding extra points or bonus points to the partner's cardholders. In some implementations, the partner may be selected based on criteria associated with cardholders. For example, the cardholders may show a historical proclivity to buy General Motors vehicles. The card issuer may wish to advantage of this by partnering with General Motors to encourage additional use of their cards. In other examples, the card issuer may determine that a large percentage of its cardholders work for the automotive industry. Here again, partnering with General Motors may encourage its cardholders to use the issuer's cards rather than a competitor's cards.

At 404, the merchant specifies the reward parameters. For example, General Motors may specify that cardholders are eligible for a predetermined number of rewards points for making purchases at dealers' parts and service centers. Bonus points may be awarded for the purchase of a vehicle. The number of points may be limited to a predetermined maximum per billing cycle or other time period, or the points may be unlimited.

At 406, the cardholders make purchases of one or more products for which the merchant has specified at rewards parameters. For example, cardholders may make purchases of parts at their local General Motors dealer. At 408, the rewards points are accumulated. As purchases are made during a billing cycle or other time frame the rewards points associated with the purchases accumulate on a per cardholder basis, on a per group basis, or both.

At 410, the rewards points are applied to the existing issuers' processes associated with the cardholders. Thus, the partnership points associated with purchases were transactions with merchant partners that may accumulate separately or in combination with other rewards programs associated with a cardholder's card.

Figure 5:
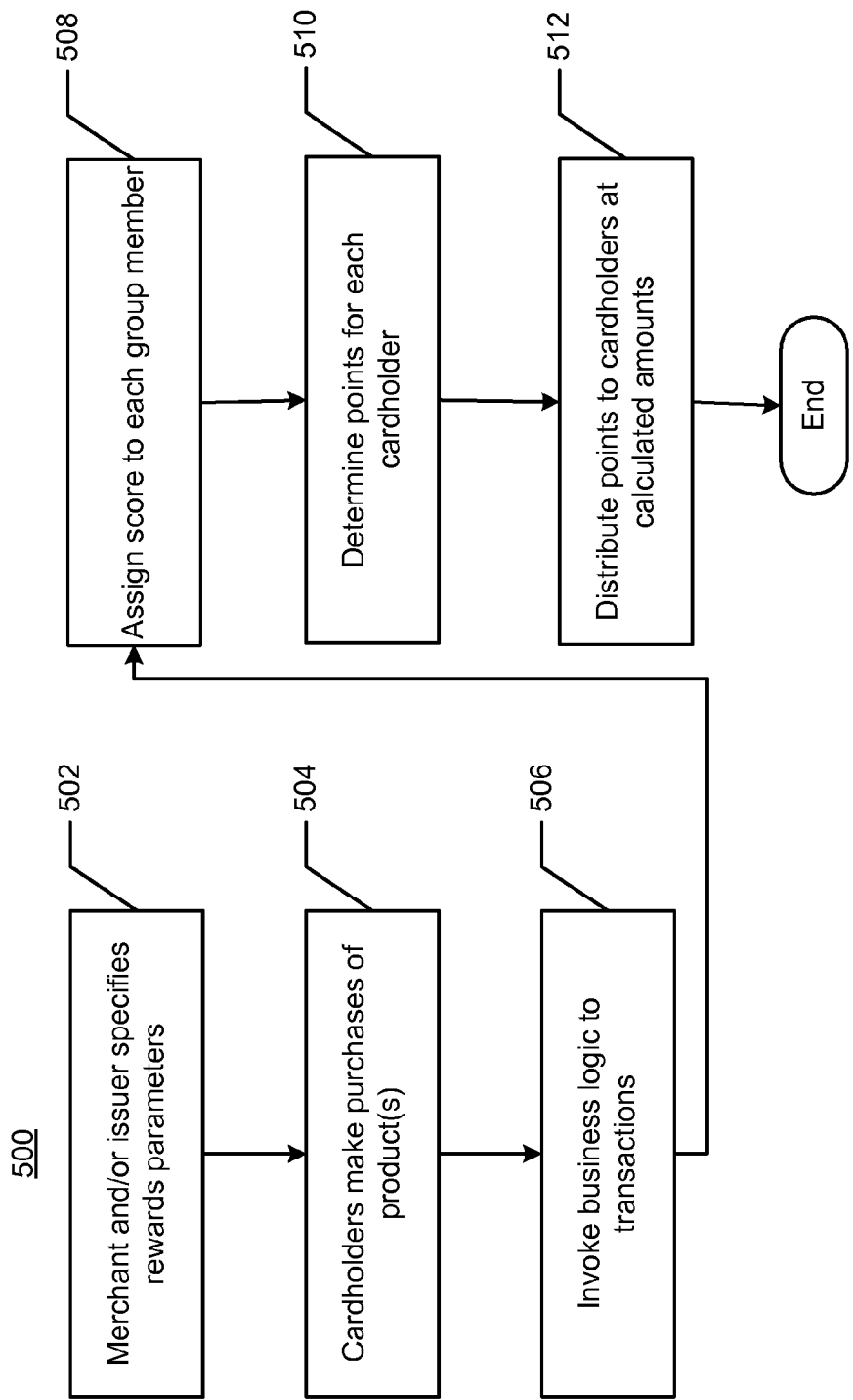
FIG. 5 illustrates an exemplary operational flow for determining and distributing rewards points to members in the group.

FIG. 5 illustrates an exemplary operational flow 500 for determining and distributing rewards points to members in a group. At 502, a billing period or time period begins with a merchant or card issuer specifying rewards parameters. At the start of a new billing cycle group members may be allocated a maximum number of rewards points. The rewards points may be different for each billing cycle. For example, to encourage purchases after the holiday shopping season, the month of January may be allocated 1000 points, whereas February is allocated 500 points, etc. By applying points in such a fashion, merchants or card issuers may influence buying transactions on a card in specified months where those months may be months of historically lower activity.

At 504, the cardholders make purchases of products and/or services. The cardholders may be influenced to purchase products and/or services from specific merchants with whom partnerships have been created, or may be influenced to make purchases of products and/or services.

At 506, business logic is invoked and applied to transactions, and at 508 scores are assigned to each group member based on the business logic. The business logic may be directed to pooling reward points for cardholders in the group 130. Conventionally, reward programs allow cardholders to earn reward points based on purchases and other account activity. However, the processing of reward points at the group level may be determined by the reward program and/or merchant partnership created (FIG. 4) and the goals of the group. As noted above, some group pooling programs may allow cardholders to be in multiple reward programs and permit pooling or accumulating of points from the multiple programs.

In some implementations, a rewards points system may be configured such that points are allocated by percentage using a few purchasing business logic rules. For example, the issuer or merchant-partner allocates 500 points that may be divided among four cardholders in the group. In a given billing cycle, each cardholder in the group may purchase their day-to-day items using the specified debit/credit card. At the end of the billing cycle, a total amount of transactions that were purchased may be weighed based on the number of items purchased or the amount of the transactions. A score or percentage from 0 to 100 may be determined. Suppose that one person received a score of 60, another person received a score of 10, the other two each received a score of 15. Thus, the cumulative scoring of each player sums to 100 (percent). The allocation of points is 200, 50, 75, and 75 points, respectively, for the billing cycle. This process may continue monthly. Other rules can be applied so that if all the players in this program exceed a certain number of transactions per cycle they are rewarded with other 'bonus points' or other offers. Yet other rules may allocate points based on credit score to encourage beneficial financial behaviors amongst the cardholders.

In some implementations, a minimum spending level may be required for cardholders within the group to earn points. Cardholders within the group that spend nothing during a billing cycle may cause no points to be awarded to the entire group, which may encourage purchases by the cardholders to the benefit of the issuer or the merchant-partner.

In addition, weighting may be applied to certain transactions with merchant-partners. Higher weights may be applied to purchases that are considered to be somewhat more positive than others, and lower weights to purchases that are not so beneficial to the cardholder, merchant, or issuer. This may encourage customers to make purchases from certain categories of goods or services. Additional rewards points could be added to each or all members in the party if in one case all members pay off their credit card at the end of the month or maintain a low balance 'X' set forth by the issuer. The group may be penalized if one or more accounts is delinquent or has a high balance.

In some implementations, the number of points available over a billing cycle may be increased over time as the group continues to participate in the pooling of reward points. In some implementations, the number of points made available may increase based on collective credit scores of the cardholders in the group. In other implementations, points may be escrowed over a period of time and used as collateral to reward good behaviors amongst the cardholders. For example, escrowed points may be awarded to one or more cardholders in the group that paid their stated balances early.

The rewards points may behave as conventional rewards points, where the points may be converted to items of interest (e.g. products such as electronic games), travel miles, cash back, etc. The business logic scoring rules may be based on one or more of an amount, type of transaction, frequency, total volume, etc. Any combination of the following may be used.

The business logic associated with group processing may include administering reward programs for the accounts in the group. Some or all of the accounts in a group may be subject to group processing for some functions and the accounts may be treated as individual accounts for other functions.

At 510, the points for each cardholder in the group are determined. The points may be determined based on the logic at 506. At 512, the points are distributed to the cardholders as determined at 510. A group statement may be created to show the allocation of points. The group statement may include information about some of the activity of the cardholder accounts (e.g., only activity relating to partnered merchants or authorized by the cardholders). The amount of information that appears on the group statement may be determined by each of the cardholders in the group. Statements may be generated at the end of billing cycles of each of the cards or at one time if all the cards in the group have the same billing cycle. The group statement may include information about pooled rewards points as a result of participation in the group 130.

Group reward points may be redeemed based on a request made by the group and/or an individual cardholder in the group. As such, an individual cardholder may redeem points is the group activity and or individual activity. In addition, a group may pool its reward points to redeem the points for products, services, cash back, etc. As part of the redemption process, an issuer's business logic may determine whether the rewards program supports pooling of group points for redemption or if reward points may only be redeemed by individual cardholders. Under either condition, after a determination is made as to whether there are sufficient points to satisfy the redemption request, the group and/or individual cardholder may redeem the points. In some implementations, an individual cardholder may be allowed to receive a transfer of rewards points from another cardholder in the group 130. Thus, if an individual cardholder does not have enough individual rewards points or rewards points from group activity credited to his/her account, it may be possible to receive rewards points from another member in the group to satisfy a redemption request.

In accordance with business logic, the pooled points earned by the group may expire after a predetermined period of time. For example, earned reward points may expire after one year if not redeemed. In some implementations, if the redemption occurs within the predetermined period of time, then earned points may roll over into a next year (or other time period).

The foregoing detailed description has set forth various embodiments of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof. While particular aspects of the present subject matter described herein have been shown and described, it will be apparent to those skilled in the art that, based on the teachings herein, changes and modifications may be made without departing from the subject matter described herein and its broader aspects and, therefore, the appended claims are to encompass within their scope all such changes and modifications as are within the true spirit and scope of the subject matter described herein.

The invention claimed is:

1. A computer implemented method for administering a group rewards pool, the method comprising:
   using a number of processors to execute computer readable instructions for:
   maintaining a group record of cardholders in the group rewards pool, wherein cardholders includes multiple individuals that are members of multiple rewards programs;
   allocating a predetermined amount of rewards points to the group rewards pool over a predetermined cycle;
   determining a score, for allocating reward points, for each cardholder in the group rewards pool based on the multiple rewards programs and on a number of goals that are associated with the group; and
   allocating rewards points from the group rewards pool to each cardholder based on the scores.

2. The method of claim 1, further comprising determining the scores based on a number of items purchased by the group.

3. The method of claim 2, further comprising allocating rewards point to each cardholder based on a percentage of the number of items purchased by each cardholder.

4. The method of claim 1, further comprising determining the scores based on a total amount of transactions by the group.

5. The method of claim 4, further comprising allocating rewards point to each cardholder based on a percentage of the total amount purchased by each cardholder.

6. The method of claim 1, further comprising determining the scores by weighting certain transactions more highly than other transactions.

7. The method of claim 1, further comprising allocating rewards points in accordance with a period of time in which the group participates in the group rewards pool.

8. A non-transitory computer-readable medium comprising computer-readable instructions for administering a group rewards pool, comprising:
    maintaining a group record of cardholders in the group rewards pool, wherein cardholders includes multiple individuals that are members of multiple rewards programs;
    allocating a predetermined amount of rewards points to the group rewards pool over a predetermined cycle;
    determining a score for each cardholder in the group rewards pool based on the multiple rewards programs and on a number of goals that are associated with the group; and
    allocating rewards points from the group rewards pool to each cardholder based on the scores.

9. The computer-readable medium of claim 8, further comprising instructions for determining the scores based on a number of items purchased by the group.

10. The computer-readable medium of claim 9, further comprising instructions for allocating rewards point to each cardholder based on a percentage of the number of items purchased by each cardholder.

11. The computer-readable medium of claim 8, further comprising instructions for determining the scores based on a total amount of transactions by the group.

12. The computer-readable medium of claim 11, further comprising instructions for allocating rewards point to each cardholder based on a percentage of the total amount purchased by each cardholder.

13. The computer-readable medium of claim 8, further comprising instructions for determining the scores by weighting certain transactions more highly than other transactions.

14. The computer-readable medium of claim 8, further comprising instructions for allocating rewards points in accordance with a period of time in which the group participates in the group rewards pool.

15. A computer system for administering a group rewards pool, comprising:
    a processor and memory:
    at least one subsystem for maintaining a group record of cardholders in the group rewards pool, wherein cardholders includes multiple individuals that are members of multiple rewards programs;
    at least one subsystem for allocating a predetermined amount of rewards points to the group rewards pool over a predetermined cycle;
    at least one subsystem for determining a score for each cardholder in the group rewards pool based on the multiple rewards programs and on a number of goals that are associated with the group; and
    at least one subsystem for allocating rewards points from the group rewards pool to each cardholder based on the scores.

16. The system of claim 15, further comprising at least one subsystem for determining the scores based on a number of items purchased by the group.

17. The system of claim 16, further comprising at least one subsystem for allocating rewards point to each cardholder based on a percentage of the number of items purchased by each cardholder.

18. The system of claim 15, further comprising at least one subsystem for determining the scores based on a total amount of transactions by the group.

19. The system of claim 18, further comprising at least one subsystem for allocating rewards point to each cardholder based on a percentage of the total amount purchased by each cardholder.

20. The system of claim 15, further comprising at least one subsystem for determining the scores by weighting certain transactions more highly than other transactions.

21. The system of claim 15, further comprising at least one subsystem for allocating rewards points in accordance with a period of time in which the group participates in the group rewards pool.

* * * * *